United States Patent Office 3,245,936
Patented Apr. 12, 1966

3,245,936
VINYL ACETATE COPOLYMERIC EMULSIONS WITH ACRYLIC ACID
Albert E. Corey, Springfield, and Forrest H. Norris, Wilbraham, Mass., assignors, by mesne assignments, to Monsanto Company, a corporation of Delaware
No Drawing. Filed Sept. 28, 1961, Ser. No. 141,300
7 Claims. (Cl. 260—29.6)

This invention relates to new polyvinyl acetate latices; more particularly, it relates to polyvinyl acetate latices in which the polymer particles are of ultra fine size, a characteristic which in combination with high polymer molecular weight renders polyvinyl acetate available for uses hitherto beyond its compass.

Polyvinyl acetate is, of course, a well known material. Methods for its preparation and suggestions for its employment abound in the literature. The monomer, vinyl acetate, has been polymerized alone or in association with a great variety of comonomers in many different ways: in bulk, in solution and in emulsion. Yet, in spite of the multitude of variations that have been designed on this theme, many interesting possibilities have remained unexploited because of technical difficulties attendant to their realization. For instance, certain types of applications require an adhesive, synthetic or natural, to bind comparatively large quantities of inert solid pigment; unfortunately, this mass of inert material interferes with the very properties of the adhesive that cause it to be selected in the first place, namely its film-forming ability, its adhesion, its toughness, and so on. It is obvious then that to meet such a demanding role, an adhesive will be required to possess a balance of intrinsic physical and chemical properties that is much more rigorously adapted to the intended use than that which is satisfactory in more prosaic applications.

The problem faced and its solution will be perhaps more clearly and readily grasped by removing this discussion from the realm of generalities to a more practical plane. Accordingly, the observations, the concepts and the methods that follow will be presented in their relation to mineral printing paper coating, one of the most important commercial uses for the new latices. There are others.

Mineral coating compositions of the type commonly applied to paper stock in the manufacture of mineral coated papers and the like, comprise aqueous suspensions of finely divided mineral matter, referred to hereinafter as pigment. Common pigments for this purpose are, among others, clay, calcium carbonate, titanium dioxide, talc, satin white, lithopone, finely divided metals such as aluminum, color lakes and tinctorial oxides. These coating compositions further comprise aqueous solutions or dispersions of an adhesive, e.g. casein, glue, starch and others.

In general, mineral coatings are applied to paper to improve its appearance, its printing qualities or other of its properties. They do so by covering the individual fibers of the paper surface and filling the interstices between the fibers, thus rendering the surface more level and more uniform in texture. It is the pigment content of the coating composition that primarily provides the desirable qualities of the coating; the adhesive serves chiefly to bind the mineral matter to the paper in a suitable manner, e.g. so that it will not be removed by the pull of printing ink during the printing operation. Nevertheless, the particular adhesive employed does have considerable influence upon the working qualities of the coating composition: viscosity, flow, spreadability, to name a few. The adhesive further affects the quality and the appearance of the finished coated paper. For example, the plasticity of the adhesive has a pronounced effect on the ability of the supercalender to produce a level and good printing surface.

It has heretofore been suggested to improve the folding quality and the flexibility of water-borne paper coatings containing casein as the adhesive by adding to the composition natural rubber latex and an antioxidant, the latex being added in amount sufficient to provide rubber solids up to one-third the weight of the casein. The resulting coated paper, when freshly prepared, has a pleasing feel and appearance and shows improved folding quality. However, upon reasonably short ageing, the coated layer becomes badly discolored and brittle, i.e. it loses its original flexibility as well as its temporarily conferred folding quality improvement.

Also suggested has been the employment of pigmented aqueous dispersions of synthetic resinous polymers. The resins so proposed include polymerized methyl acrylate, ethyl acrylate, butyl acrylate, alone or copolymerized with acrylonitrile or with a lower alkyl methacrylate. Such polymers have failed however, since, because of the insufficiency of their adherence to paper, their resistance to the pull of printing ink during printing operations is not reliable.

Why not improve the adhesion of these acrylic polymers by the addition of an acid that is copolymerizable with the acrylate monomers, such a methacrylic or acrylic acid? It has been tried. Unfortunately, when such copolymers are used with clay, the most common and cheapest paper pigment, there results at PH values of 8.5 to 9.0, the range for optimum dispersion of the clay system, compositions with viscosities so high that their application to paper demands extreme care. To avoid viscosity difficulties, it has been further proposed to use, along with the principal monomer, from 2 to 7% of a copolymerizable polybasic acid such as, for example, itaconic or maleic acid. This has resulted in some improvement.

In spite of these improvements, the acrylic binders nevertheless still suffer from significant shortcomings. In this respect, let us recall that, in general, as was intimated earlier, the adhesive in a mineral coating adds little to the printing quality of the coated paper, but, on the contrary, actually detracts from the positive contribution of the pigment. This is one of the reasons, for instance, for the use of a minimum amount of binder in the coating composition, namely just enough to permit satisfactory performance of the paper in its intended use. One of the important characteristics of paper coating that is adversely affected by such adhesives is ink receptivity. The problem is that the amount of binder sufficient to bind the pigment strongly enough to paper so that it will not be picked by the ink in printing will often decrease ink receptivity of the coating to undesirable levels. Acrylics do not distinguish themselves in this respect. Another serious defect of synthetic resinous binders is their cost, as compared to that of the inorganic pigments, an important consideration in a high volume industry such as papermaking.

In a sense, it is somewhat surprising that none of the polyvinyl acetate preparations taught by the art has found acceptance in this type of application. But then when the complexity of the balance of required properties is considered, some of this being almost antithetic in nature as will be pointed out later in discussing the relationship of particle size to emulsion viscosity for a given solids content, it is almost as surprising that the synthetic adhesives just reviewed have succeeded in displacing to some extent natural materials.

It is therefore the primary object of this invention to prepare a new and improved type of synthetic resinous latex binder for inert mineral pigment applications. Another object is to take advantage of the relatively low cost of polyvinyl acetate, as synthetic resins go, in this type of application. Another object is to prepare synthetic resin latices for mineral paper coating compositions which combine high ink pick resistance, good printability and excellent stability.

These and other objects have been attained by the preparation of special polyvinyl acetate latices containing relatively small amounts of acrylic acid monomer. These latices are formed by the polymerization of vinyl acetate monomer in aqueous emulsion at a temperature sensibly lower than that normally necessary for such polymerization reaction to occur within an economically reasonable period, such a temperature becoming functional through the agency of a free radical producing redox initiator.

Unlike the hitherto available polyvinyl acetate emulsions, the new latices possess all the necessary properties for application as binders in high inert solids formulations. These properties can be summarized as follows: the latices themselves are stable on storage, they do not settle or coagulate; after incorporation of a high solids inert pigment slip, they retain good flow characteristics and spreadability, this being partially a function of the viscosity of the latices; as to the resulting binder in the finished product which is the continuous phase holding together the pigment particles scattered throughout the coating system, it is colorless, flexible, tough, adherent and stable. The improvements in the properties that have been affected can be ascribed ultimately to two basic characteristics of the latices: the extremely small particle size of the suspended resin and the relatively large molecular weight of the polymer.

A definite relationship has been observed between the particle size of an adhesive emulsion and its usefulness as a binder for pigment. The net effect is that, as the particle size decreases, a greater interspersion of the polymer within the pigment is achieved. This can readily be visualized by considering that for a given mass of adhesive, the total surface and the number of particles will increase significantly as the diameter of the particles diminishes. In this respect, the latices of this invention are well favored in comparison to previously available polyvinyl acetate emulsions: the diameter of their particles ranges between 0.07 and 0.16 micron, with an arithmetical average of 0.09 micron—magnitudes which are sensibly smaller than the wavelength of visible light (0.4–0.7 micron). It is equally remarkable that one formed the particles retain their original infinitesimal size on storage, i.e., they do not aggregate into larger particles.

Another advantage of the present latices over those heretofore available is that despite their ultra fine particle size and their satisfactory polymer solid content (30–55% by weight), they possess a viscosity such that they retain good flow and spreadability characteristics upon admixture of large quantities of pigment. In contrast, previously available polyvinyl acetate emulsions which had a particle size merely approaching that of the present ones were too thin or too thick for the applications contemplated. It is obvious that the addition of a thickening agent or dilution, as indicated, to change the viscosity of such emulsions would merely create new problems and would not adjust the polymer concentration to a usable level. It is therefore surprising that the particle size of the present latices has been decreased drastically without incurring the rise in viscosity which usually attends such a phenomenon.

Equally remarkable is the fact that the molecular weight of the uncrosslinked polymer has been raised to an average of 100,000, a value several times higher than that which is common for polyvinyl acetate in fine particle emulsions. More remarkable yet, the polymer molecular weight can be increased considerably further by using small amounts of selected crosslinking agents. Higher molecular weight, of course, results in stronger intermolecular attraction, a feature sorely needed in a system where the binder's properties are subject to the disruptive effects of very large numbers of inert pigment particles.

The preparation and the properties of a typical new latex are described in the following example. This and later examples are provided merely as illustrations of the invention and are not therefore to be construed as limiting it in any fashion.

*Example 1*

A polyvinyl acetate latex was prepared from the following ingredients.

| Material: | Parts (by weight) |
| --- | --- |
| Water | 53.70 |
| Aerosol OT (75%) | 0.60 |
| Aerosol MA (80%) | 0.56 |
| Sodium bicarbonate | 0.17 |
| Sodium formaldehyde sulfoxylate | 0.08 |
| t-Butyl hydroperoxide (in monomer) | 0.08 |
| Vinyl acetate | 45.31 |
| Acrylic acid | 0.69 |

The "Aerosols" are heat stable wetting agents which are soluble in practically all non-aqueous media as well as in water; they are esters of sulfonated dicarboxylic acids, "OT" being a 75% by weight solution of sodium dioctyl sulfosuccinate and "MA," an 80% solution of its dihexyl homolog.

The sodium bicarbonate and the Aerosols were dissolved in the water. The resulting solution was placed in the reaction container and purged with nitrogen. The sodium formaldehyde sulfoxylate was then dissolved in the purged solution. The vinyl acetate, acrylic acid and t-butyl hydroperoxide were then combined and five percent of this mixture was charged into the reaction kettle, the balance being added gradually over a subsequent period of 2.5 hours. The temperature of the reaction mixture was kept within the range of 40–45° C. at all times, with external cooling when necessary. After completion of the addition process, the reaction mixture was stirred for 1.5 hours more, heating when necessary to keep the temperature within the prescribed range. The inert atmosphere was maintained at all times.

The properties of this latex were determined to be as follows:

Total solids _____. 46–47% by weight.
Brookfield viscosity . 37 cps. (30 r.p.m., No. 1 spindle).
pH _____. 5.95.
Polymer viscosity _. 141.5 cps. (0.6 molar solution, benzene, 20° C.).
Particle size _____. About 0.1µ average.

*Example 2*

The latex of Example 1 was mixed with a pigment slip and applied to paper stock according to conventional paper coating methods in proporitons such that the finished dry coating contained 9 parts of polymer binder per 100 parts of pigment. The pick resistance of the resulting paper was determined to be 199 feet per minute. The comparison of this value with those which shall be reported for other latices will provide an excellent measure of the binding strength of such latices under actual conditions of use. The pick resistance of a coated paper is a measure of the surface strength of the paper, such strength being a function of the coating adhesive as well as of the paper base itself. In the process of printing, fairly viscous inks are employed which, in cases where the paper printed on is deficient in surface strength, will pick or lift the paper surface (fibers, mineral pigment and binder) and transfer it directly or indirectly to the type. This is obviously a very undesirable phenomenon.

Pick resistance is best measured by means of an IGT (Institute for the Graphic and Allied Industries, Holland) Printability Tester. This instrument is so engineered that it simulates actual printing conditions. It functions by determining the paper velocity at which an ink of known tack will cause paper failure, the results being rendered as feet per minute at pick point. The utility of the test resides in that it permits the quantitative comparison of different printing papers and ultimately of the value of different binder dispersions used in making the papers compared. A control paper is usually run with each set of determinations in order to minimize the effect of variations in paper stock, latex emulsion, pigment slip, and so on. The pick resistance of a given paper may thus be given in terms of percentage of that of the control paper.

The coating composition which has been employed as a control was prepared with a commercially available acrylic copolymer binder. This type of copolymer, as discussed earlier, is made of ethyl acrylate, methyl methacrylate and acrylic acid; it contains no vinyl acetate.

Paper coated with the control preparation was found to have a pick resistance of 205 feet/minute, while that of paper coated with the polyvinyl acetate preparation of this example was virtually the same, i.e. 199 feet/minute. In view of the reproducibility characteristics of the test, the 3% difference in these two measurements is not significant. The excellent performance of the polyvinyl acetate binder, on the other hand, is quite unexpected since, as a general rule, the harder a binder resin is, the lower its pick resistance will be. Given the fact that the polyvinyl acetate polymer used here is sensibly harder than the acrylic resin control, one would not have expected comparable performance in this respect. In addition to these surprising results, it should be noted that the paper coated with the polyvinyl acetate preparation showed greater ink receptivity than its acrylic competitor.

*Example 3*

This preparation was essentially similar to that of Example 1 except that the Aerosol OT was replaced by a nonionic alkyl aryl polyether alcohol, the reaction product of one mol t-octylphenol with 30 mols ethylene oxide. When 2.86 parts of this surfactant (at 70% concentration) was used in the basic formulation of Example 1, a printing paper coated with a composition containing the resulting latex and pigmented as in Example 2 had a pick resistance of 241 ft./min. or 131% of that of the acrylic control binder, an excellent performance. This latex had a Brookfield viscosity of 300 centipoises and a polymer viscosity of 49.5 centipoises.

*Example 4*

Paper coated with another formulation employing a binder made with 4.25 parts of 70% t-octylphenol:ethylene oxide surfactant, rather than with 2.86 parts as in Example 3, had a pick resistance of 181 ft./min., 99% of that of the acrylic binder control paper. The Brookfield viscosity of the unpigmented latex was 52 centipoises and the polymer viscosity, 48.8 centipoises.

*Example 5*

Another latex was prepared according to Example 1 with the following ingredients.

| Material: | Parts |
|---|---|
| Water | 51.54 |
| Aerosol MA (80%) (dihexylsulfosuccinate) | 0.56 |
| t-Octylphenol:ethylene oxide (70%) | 3.57 |
| Vinyl acetate | 43.51 |
| Acrylic acid | 0.44 |
| Cyclol acrylate | 0.05 |
| Sodium bicarbonate | 0.17 |
| Sodium formaldehyde sulfoxylate | 0.08 |
| t-Butyl hydroperoxide (in monomer) | 0.08 |
| | 100.00 |

This formulation includes cyclol acrylate as a crosslinking agent, "cyclol acrylate" being simply the common name for the acrylate of 5-hydroxymethyl-bicyclo(2,2,1)-hept-2-ene. Note that the monomer proportions here are 98.89:1.00:0.11 for the vinyl acetate, the acrylic acid and the crosslinking agent respectively.

The latex containing this polymer has a Brookfield viscosity of 35 centipoises. No polymer viscosity measurement could be obtained because of the insolubility of the polymer in benzene, an indication of the rather high molecular weight attained through crosslinking Coated paper prepared with this binder showed a pick resistance 118% as great as that of control acrylic binder paper. Interestingly, the extra fine particle size of the earlier latices was preserved in spite of the much larger molecular weight obtained here. As a result of this innovation, printing paper prepared with this particular latex was found to have an excellent balance of properties such as appearance, stability, toughness, printability, and so on.

*Examples 6–11*

The latex compositions of these examples are again based substantially on the formulation of Example 1 except for the changes in nature and proportion of monomers and initiator that are indicated in the following table:

| Ex. | Monomer composition, percent | | Other | Catalyst | Viscosity | | Pick resistance (ft./min.) |
|---|---|---|---|---|---|---|---|
| | VAc | AA | | | Latex (cps.) | Polymer (cps.) | |
| 6 | 98.5 | 1.5 | | NaFS:t-BHP (2:1) | 82 | 154 | 175 |
| 7 | 98.5 | 1.5 | | NaFS:t-BHP (1:1) | 120 | 61.2 | 189 |
| 8 | 80.5 | 1.5 | EA, 18.0% | $K_2S_2O_8$ | 18 | 44.5 | 143 |
| 9 | 75.0 | 1.5 | DBM, 23.5% | $K_2S_2O_8$ | 900 | n.d. | 124 |
| 10 | 99.0 | 1.0 | | $H_2O_2$:$FeCl_3$ | 154 | n.d. | 14 |
| 11 | 100.0 | | | $H_2O_2$:$FeCl_3$ | 2,560 | n.d. | 55 |

(Abbreviations: VAc is vinyl acetate; AA, acrylic acid; EA, ethyl acrylate; DBM, di-n-butyl maleate; NaFS, sodium formaldehyde sulfoxylate; t-BHP, tertiary-butyl hydroperoxide and cps. is centipoises. "n.d." stands for unavailable values.

As in other examples, the pick resistance measurements were made on paper coated with these latices pigmented as in Example 2.

A comparison of the pick resistance values shown in the table clearly demonstrates the superiority of the latices prepared with a redox initiator (Examples 6 and 7). Incidentally, these two examples also illustrate the preferability of using equal weights of oxidizer and reducer, in this case 0.08% by weight, based on the total formulation weight, of each initiator system component. It has been advanced earlier that a redox system allows polymerization to occur at temperatures below 50° C. and that this accounts partially for the ultra fine particle size of the dispersions which has been found to be the factor most directly related to the excellent performance of the latices. A glance at the 14 ft./min. pick resistance of the latex of Example 10, prepared with a more conventional initiator system, certainly and eloquently supports this contention.

It also becomes evident, on contrasting the pick resistance value of Example 10 with those of Examples 6 and 7, that the role of acrylic acid as a stabilizer is of significant import only when the polymerization has taken place under temperatures of 50° C. or less. If the reaction be carried out at reflux temperature, as is necessary when the hydrogen peroxide-ferric chloride initiator system is used, the polymer particles formed will be so much larger that, as far as pick resistance is concerned, nothing will be gained by the use of acrylic acid.

The terpolymers of Examples 8 and 9 illustrate the most satisfactory vinyl acetate polymers that were available heretofore. In comparing these latices to those of Examples 6 and 7, it can readily be seen that the necessity of employing a third monomer such as ethyl acrylate or dibutyl maleate has been removed, thereby reducing cost appreciably, and that the problem of forming a dispersion of vinyl acetate polymer of ultra fine particles has not only been solved but also has led to dispersions of the most satisfactory type to date for application to printing paper and other similar uses.

It has been found that in the exercise of this invention the best results are obtained when the polymerized vinyl acetate contains from 1.0 to 1.5% of acrylic acid, based on the total weight of the monomers. Satisfactory stabilization and increased adhesion to substrates may be obtained, however, with any acrylic acid content within the range of 0.5 to 3.0%. Smaller or larger amounts of this monomer would either have no effect or would unfavorably alter some important properties of polyvinyl acetate, such as ink receptivity, without adding at all to the excellent adhesion of the binder to substrates.

The surfactants usable in the formulations may be anionic, cationic or nonionic. Preferred, however, are anionic and nonionic compounds and mixtures thereof. Variations in the type and amount of such agents will influence the stability of the emulsions as well as the progress of the polymerization in known manner but the effect of such variations is not contemplated as a part of the present invention, except as further influenced by the action of the acrylic acid. In any event, the surfactants used should contain at least twelve carbon atoms and their total weight should not exceed 5% of the total formulation weight. Examples of anionic emulsifying agents that may be used include the higher fatty alcohol sulfates such as sodium lauryl sulfate, the alkylaryl sulfonates such as sodium t-octylphenyl sulfonate, the sodium dioctylsulfosuccinates, the sodium dihexylsulfosuccinates, and so on. Typical cationic agents that may be employed include: condensates of ethylene oxide with long chain amines such as a tertiary coco amine in which the active hydrogen atoms have been substituted with $x$ and $y$ moles of ethylene oxide respectively and where $x+y$ is equal to 10; compounds such as stearamideisopropyl-dimethyl-$\beta$-hydroxyethyl ammonium phosphate and others. Among the usable nonionic dispersants are the alkylphenoxypolyethoxyethanols having alkyl groups of about 7 to 18 carbon atoms and 6 to 60 or more oxyethylene units, such as octylphenoxypolyethoxyethanols; the polyethoxyethanol derivatives of methylene linked alkyl phenols; the ethylene oxide derivatives of long chain carboxylic acids such as lauric, myristic, oleic, or mixtures of such acids as found in tall oil, containing 6 to 60 oxyethlene units per molecule; block copolymers of ethylene oxide and propylene oxide comprising a hydrophobic propylene oxide section combined with one or more hydrophilic ethylene oxide sections.

Ultra fine particle polymers are obtained by the agency of a two component redox free radical initiator system. Suitable oxidizing components for the system are the inorganic peracid salts such as ammonium, potassium and sodium persulfates, perborates, and the like. Preferred, however, are the oil soluble organic hydroperoxides such as t-butyl hydroperoxide, cumene hydroperoxide and esters of the t-butyl perbenzoate type. Among the useful reducing components may be listed compounds like the sulfites, bisulfites, hydrosulfites and thiosulfates; ethyl and other alkyl sulfites; the sulfoxylates, such as sodium formaldehyde sulfoxylate; and the like.

The use of equal weights of initiator system components is generally preferred although the amount of each component as well as the total amount of catalyst depend on the type of component used as well as on other polymerization conditions and may range between .04 and 0.2% by weight of the total polymerization system, the preferred range being 0.06 to 0.1%. The polymerization reaction should be carried out at temperatures below 50° C. and preferably between 35 to 45° C.

The advantages of the latices are maximized by the use of a small amount of crosslinking agent, i.e. an amount ranging from 0.01 to 0.1% of the total dispersion system weight; 0.05% will generally be found sufficient. Examples of satisfactory crosslinking agents include cyclol acrylate, diallyl fumarate, vinyl crotonate, and other compatible diethylenic monomers.

As mentioned earlier, any of the conventional mineral pigments or mixtures of pigments may be employed with the latices, the nature and amount of each pigment being primarily dependent upon the use intended for the preparation. The proportions of solid polymer binder to pigment may vary quite widely. In coating printing paper, for instance, formulations containing from about 3 to about 25 parts by weight of solid binder per 100 parts of mineral pigment are preferred, the best balancing of cost, adhesion and ink receptivity being achieved with about a 9:100 ratio.

Any paper raw stock may be used for coating with mineral pigment formulations containing polyvinyl acetate latex provided such stock is sufficiently strong to be printed upon without splitting under the pull of lithographic ink.

Many other uses for the formulations of this invention will suggest themselves to persons skilled in the art. For example, since the latices are readily coagulated by alum, they serve excellently as wet end additives in the manufacture of paper products such as are employed in egg boxes, fruit separators, and so on. Properly plasticized, they are excellent paint bases. Other possible uses include also textile printing and ceramic coatings.

What is claimed is:

1. A stable aqueous latex comprising as essential constituents 30 to 55% by weight of a resinous binder which is the polymerized product of a monomer mixture, consisting of vinyl acetate and 0.5 to 3.0%, based on the total monomer mixture weight, of acrylic acid, and from about 1 to 5% by weight, based on the latex weight, of emulsifier; wherein the diameter of the polymer particles is smaller than the wavelength of visible light.

2. The latex of claim 1 containing about 0.05%, based on the latex weight, of a crosslinking agent selected from the group consisting of the acrylate of 5-hydroxymethylbicyclo(2,2,1)-hept-2-ene, vinyl crotonate and diallyl fumarate.

3. A printing paper coating composition comprising essentially an aqueous pigment suspension and the latex of claim 1, in proportions such that there are 3 to 25 parts by weight of the resinous binder for each 100 parts of pigment, on a dry basis.

4. Printing paper coated with the composition of claim 3, wherein the proportion of resin binder to pigment is 9 to 100 by weight, dry basis.

5. The latex of claim 1 wherein the polymer particles have a diameter ranging from 0.07–0.16 micron with an arithmetical average of 0.09 micron.

6. A process for obtaining a polyvinyl acetate latex having ultrafine particles which consists essentially in (a) preparing a monomer solution consisting of, as active chemical ingredients, vinyl acetate admixed with 1.0–

1.5% by weight of acrylic acid and about 0.11% by weight of the acrylate of 5-hydroxymethyl-bicyclo(2,2,1)-hept-2-ene, (b) adding to the monomer mixture a catalytic amount of an oil soluble oxygen-yielding polymerization initiator, (c) adding the resulting solution gradually over a period of 2.5 hours to enough water so that the emulsion ultimately obtained will have a polymeric solids content of 30–55% by weight, said water containing originally the reducing component of a redox initiator system in an amount approximately equal in weight to the oxygen-yielding component and enough emulsifier so that it constitutes from about 1 to 5% of the final emulsion weight, and (d) continuing the agitation of the mixture until the polymerization is complete; the reaction mixture being kept throughout this process at a temperature selected from the range of 35–45° C. and the reducing component of the initiator system being protected from atmospheric oxygen at all times.

7. The process of claim 6 wherein 0.6 to 1.0% of a redox initiator is used which is composed of equal weights of sodium formaldehyde sulfoxylate and t-butyl peroxide.

References Cited by the Examiner
UNITED STATES PATENTS

| | | | |
|---|---|---|---|
| 2,265,640 | 12/1941 | Garvey et al. | 260—80.3 |
| 2,444,396 | 6/1948 | Collins et al. | 260—29.6 |
| 2,473,929 | 6/1949 | Wilson | 260—29.6 |
| 3,010,929 | 11/1961 | Jones | 260—29.6 |
| 3,092,600 | 6/1963 | Ozawa | 260—29.6 |
| 3,133,040 | 5/1964 | Sanfilippo | 260—29.6 |

SAMUEL H. BLECH, *Primary Examiner.*

LEON J. BERCOVITZ, MURRAY TILLMAN,
*Examiners.*